C. C. CAMPBELL.
Baling-Press.

No. 168,969.

Patented Oct. 19, 1875.

WITNESSES:
W. W. Hollingsworth
J. C. Kemon

INVENTOR:
C. C. Campbell
BY
ATTORNEYS.

UNITED STATES PATENT OFFICE.

CHRISTOPHER C. CAMPBELL, OF EAST CHATHAM, NEW YORK.

IMPROVEMENT IN BALING-PRESSES.

Specification forming part of Letters Patent No. 168,969, dated October 19, 1875; application filed September 30, 1875.

*To all whom it may concern:*

Be it known that I, CHRISTOPHER C. CAMPBELL, of East Chatham, in the county of Columbia and State of New York, have invented a new and Improved Baling-Press; and I do hereby declare that the following is a full, clear, and exact description of the same, reference being had to the accompanying drawing forming a part of this specification, in which—

Figure 1:
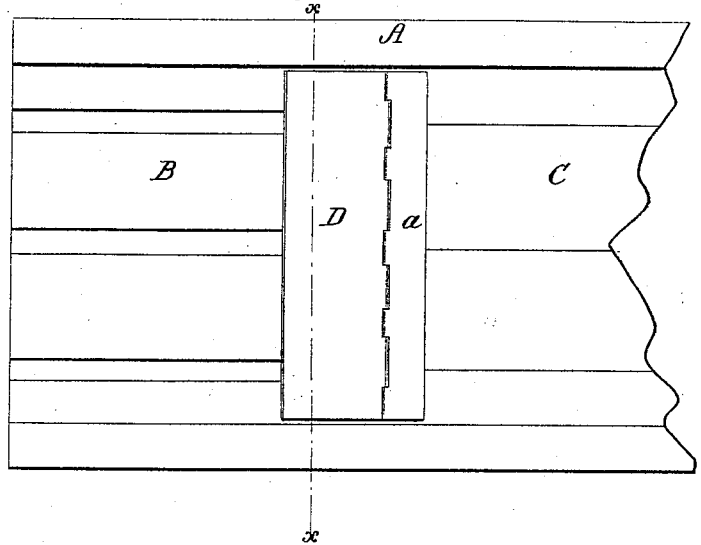
Figure 2:
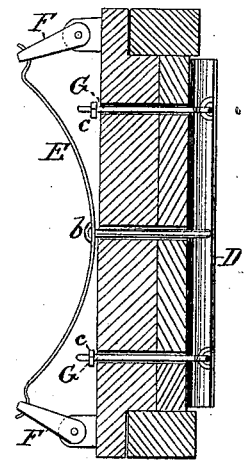
Figure 3:
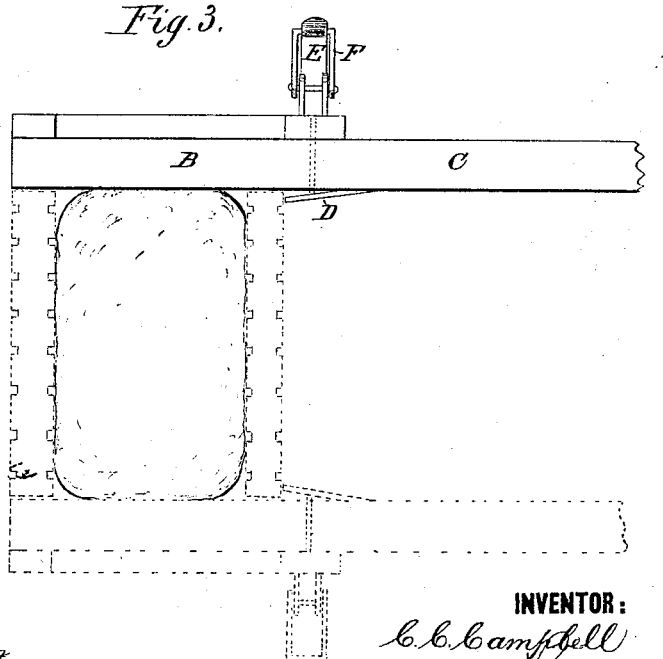

Figure 1 is an elevation of one side of the press, showing the hinged leaf from the inside; Fig. 2, a vertical transverse section through line x x. Fig. 3 is a plan view, showing the relation of the devices, showing their relation to the coacting parts of the press.

This invention relates to certain improvements in baling-presses in which the platen and follower are successively interchangeable, and the operations of pressing and tying are both conducted at the same time, the compressed bale being held in position for being tied while the box is being filled and the succeeding bale pressed. It consists in the peculiar construction and arrangement of the stop devices for holding and retaining the follower in the rear of the bale, which has been forced into the slatted portion of the box ready for tying, so as to admit of the filling of the box in the rear for a new bale.

In the drawing, A represents one of the sides of a baling-press provided with my improvement, in which B represents the slatted portion, in which the compressed bale is retained for tying; and C, the rear portion of the box in which the cotton, hay, or other material is placed, and in which the detachable follower works. D is a hinged leaf extending from the top to the bottom of each side of the press, and fastened to the same at a. Said leaves are projected inwardly by means of springs upon the outside, and operate as pawls to open behind the follower, and retain the same for holding the compressed bale in position for tying. E are springs upon the outside of the press, which may be semi-elliptical, as shown, or of other desired shape. Said springs are detachably held to the side frame by means of the pivoted links F, and are provided with a central bolt, b, rigidly attached thereto, which passes through the side of the press, and bears against the leaves to impart the pressure of the springs to them and project them inwardly. Said bolt may be adjustably fixed to the spring, if desired, so as to regulate the tension. G G are bolts, passing also through the sides of the press, and attached, by means of eyes, to the leaves D. Said bolts are provided upon the outside with nuts c, by means of which the leaves may be adjusted either closer in to the sides or farther out, as may be desired.

Having thus described my invention, what I claim as new is—

1. The combination, with the sides of a cotton-press, of hinged spring-seated leaves, as and for the purpose described.

2. The combination, with the hinged leaves D, of the springs E, carrying bolt b, pivoted links F, and adjusting-eyebolts G G, as and for the purpose described.

CHRISTOPHER C. CAMPBELL.

Witnesses:
HARRISON CLARK,
H. S. PRATT.